United States Patent Office 3,232,951
Patented Feb. 1, 1966

3,232,951
PHOSPHORIC, PHOSPHONIC AND PHOSPHINIC ACID ESTERS OF 3-HYDROXYBENZISAZOLES, AND THEIR THIO ANALOGUES
Walter Lorenz, Wuppertal-Vohwinkel, Germany, assignor to Farbenfabriken Bayer Aktiengesellschaft, Leverkusen, Germany, a German corporation
No Drawing. Filed Nov. 17, 1964, Ser. No. 411,688
Claims priority, application Germany, Feb. 14, 1962, F 36,028; Feb. 19, 1962, F 36,064
20 Claims. (Cl. 260—304)

This application is a continuation-in-part of Serial No. 328,047, filed December 3, 1963, which is in turn a continuation-in-part of Serial No. 257,846, filed February 12, 1963, and Serial No. 259,349, filed February 18, 1963, all three applications now abandoned.

The present invention relates to and has as its objects new and useful insecticidally active phosphorus containing compounds. More specifically this invention is concerned with phosphoric, phosphonic and phosphinic acid esters and their thio analogues of the general formula

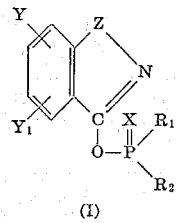

(I)

as well as processes for the production of such compounds. In the above formula $R_1$ and $R_2$ stand for optionally substituted alkyl or alkoxy, alkylamino, dialkylamino or aryl groups, X is oxygen or sulfur, Z is oxygen or sulfur and Y and $Y_1$ denote hydrogen, chlorine, bromine, iodine as well as alkyl, alkoxy or alkylmercapto or commonly represent a fused benzene nucleus.

In the preferred compounds according to the invention $R_1$ and $R_2$ stand independently for a member selected from the group consisting of lower alkyl having up to 4 carbon atoms, lower alkoxy having up to 4 carbon atoms, lower alkylamino having up to 4 carbon atoms and lower dialkyl amino having up to 4 carbon atoms, X and Z stand independently for a chalkogen of an atomic weight less than 40 and Y and $Y_1$ stand independently for a member selected from the group consisting of hydrogen, chlorine, bromine, iodine, lower alkyl having up to 4 carbon atoms, lower alkoxy having up to 4 carbon atoms and lower alkyl mercapto having up to 4 carbon atoms.

In the above formula it is of course apparent that when $R_1$ and $R_2$ are both alkoxy and X is oxygen, the ester is phosphoric; when $R_1$ and $R_2$ are both alkoxy and X is sulfur, the ester is thiophosphoric; when one of $R_1$ and $R_2$ is alkoxy and the other alkyl and X is oxygen, the ester is phosphonic; when one of $R_1$ and $R_2$ is alkoxy and the other is alkyl and X is sulfur, the ester is thiophosphonic; when both $R_1$ and $R_2$ are alkyl and X is oxygen, the ester is phosphinic and when both $R_1$ and $R_2$ are alkyl and X is sulfur, the ester is thiophosphinic.

Also, when Z is oxygen the resulting compound is a derivative of benzisoxazole and when Z is sulfur the resulting compound is a derivative of benzisothiazole. Thus the compounds according to the invention may be considered as benzisoxazole or benzisothiazole derivatives of phosphonic, phosphoric or phosphinic esters or their thio analogues according to the general Formula I.

Phosphoric acid and thiophosphoric acid esters of uncondensed heterocyclic ketones with an endocyclic enolisable keto group are already known from the literature. One of the best known compounds of this class is the O,O-diethyl-O-(2-isopropyl-4-methylpyrimidyl-(6))-thionophosphoric acid ester applied in pest control (cf. German patent specification No. 910,652).

On the other hand phosphoric or thiophosphoric (-onic, -inic) acid esters of 3-hydroxy 1,2-benzisoxazols-(1) i.e. of compounds of the following formula

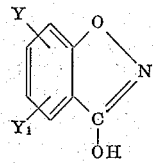

are not yet known from the literature.

3-hydroxy-1,2-benzisoxazole has not hitherto been described in the literature. According to L. Clisee, Journal für praktische Chemie (2), vol. 122, p. 243, the compound described by Lindemann and Schultheiss as 3-hydroxy-1,2-benzisoxazole is a salicylamide. 3-hydroxy-1,2-benzisoxazole and its derivatives substituted in the benzene nucleus have only recently become available by the method described in the copending application Serial No. 245,401.

On the other hand the 3-hydroxy-1,2-benzisothiazoles of the general formula

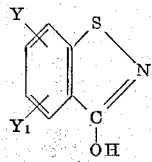

are known from the literature (cf. E. W. McClelland and A. J. Gait, Journal of the Chemical Society (London), 1926, p. 923; A. Reinert and F. Manns, Berichte der deutschen chemischen Gesellschaft, vol. 61, p. 1312 (1928)).

In the last-mentioned formulae Y and $Y_1$ have the same significance as given above.

In accordance with the present invention it has now been found that the compounds of the general Formula II react with (thio) phosphoric (-onic, -inic) acid chlorides (III), especially at moderately elevated temperatures (e.g. 40 to 70° C.), preferably in the presence of acid-binding agents, to give the compounds of the present invention. The reaction may be illustrated by the following scheme:

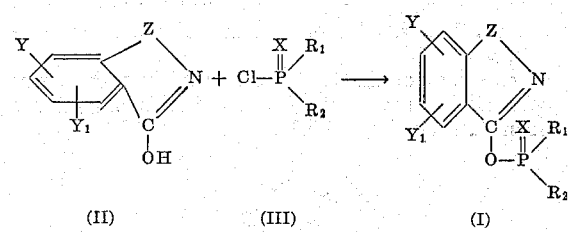

In these formulae the symbols $R_1$, $R_2$ X, Z, Y and $Y_1$ have the above given significance.

The process according to the invention is preferably carried out in the presence of acid binding agents. Anhydrous alkali metal carbonates and alkoxides as well as tertiary bases, for instance pyridine, triethylamine, or dimethylaniline are particularly suitable for this purpose. However, it is just as satisfactory first to prepare the alkali metal or ammonium salts of the above mentioned 3-hydroxy-1,2-benziso-thi-and-ox-azoles and subsequently to react them with the (thio) phosphoric (-onic, -inic) acid chlorides.

In addition, it is appropriate to employ inert organic solvents for the execution of the reaction. Lower aliphatic ketones or nitriles such as acetone, methyl ethyl ketone, methyl isobutyl ketone, or acetonitrile, as well as aromatic hydrocarbons, for instance benzene, toluene, or xylene, and also dimethylformamide and N-methylpyrrolidone have proved particularly suitable for this purpose.

In accordance with a special form of execution of the process the employed acid binding agent can at the same time serve as the solvent, provided that it is liquid under the prevailing reaction conditions.

The reaction is preferably carried out at room temperature or at slightly elevated temperatures. However, since the reaction usually proceeds with a more or less strongly positive heat indication, it is in many cases necessary to cool the mixture externally.

Finally, it has proved an advantage if stirring of the reaction mixture is continued at room temperature for a prolonged period (usually overnight) after the starting components have been combined in order to complete the reaction and thus to attain good yields as well as pure products of the process.

The inventive (thio) phosphoric (-onic, -inic) acid esters of 3-hydroxy-1,2-benziso-thi- or ox-azoles and its derivatives usually constitute colourless to slightly coloured oils which can be distilled without decomposition under a greatly reduced pressure; however, in part the products are also obtained in the form of crystalline substances which can readily be further purified by recrystallisation from the usual solvents and possess a sharp melting point.

The products of the present invention are distinguished by excellent insecticidal action against a number of harmful pests. The compounds are therefore intended to be used as pest control agents in agriculture and in the veterinary field.

The new compounds of the present invention very effectively kill insects like aphids, spider mites, caterpillars, flies, etc. They distinguish themselves especially by a good contact-insecticidal activity and mostly also by a systemic action. At the same time they have an activity on eating insects such as caterpillars. Most surprisingly they are of remarkably low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like. As liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc.

As examples of the special utility of inventive compounds (i.e., benzisoxazole) wherein Z is oxygen are those of the following formulae (I) 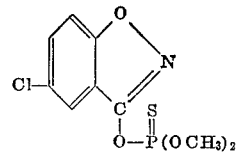

(II) 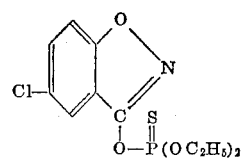

These compounds have been tested against aphids (compounds I and II), spider mites (compound II), caterpillars (compound II) and flies (compound I). Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture with water to the desired concentration indicated in the following paragraphs:

The tests have been carried out as follows:

(a) Against aphids (species *Doralis fabae*): Heavily infested bean plants (*Vicia faba*) have been sprayed drip wet with solutions as prepared above. The effect has been determined after 24 hours by counting the dead pests either on the surface of the soil or still remaining on the plants.

The following results have been obtained:

| Compound | Aqueous concentration (in percent active ingredient/water) | Killing rate in percent |
|---|---|---|
| I | 0.001 | 100 |
| II | 0.0001 | 100 |

(b) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate in percent |
|---|---|---|
| II | 0.0001 | 50 |

(c) Against caterpillars of the type diamondback moth (*Plutella maculipennis*): White cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (in percent active ingredient/water) | Killing rate in percent |
|---|---|---|
| II | 0.001 | 100 |

(d) Against flies: About 50 flies (*Musca domestica*) are placed under covered petri dishes in which drip wet filter papers have been placed which are sprayed with insecticidal solutions of concentrations as shown below. The living status of the flies has been determined after 24 hours. The following results have been obtained:

| Compound | Aqueous concentration (in percent active ingredient/water) | Killing rate in percent |
|---|---|---|
| I | 0.001 | 100 |

As examples for the special utility of inventive compounds wherein Z is sulfur (i.e. benzisothiazole) are those of the following formulae (III) 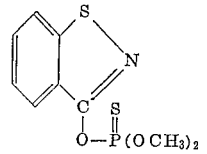

(V) 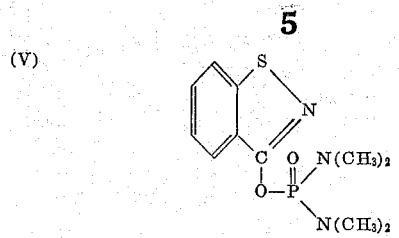

(IV) 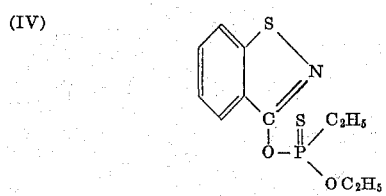

have been tested against aphids (compounds III), spider mites (compounds III and IV), caterpillars (compound V) and flies (compound IV). Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs:

The tests have been carried out as follows:

(a) Against aphids (species *Loralis fabae*): Heavily infested bean plants (*Vicia faba*) have been sprayed drip wet with solutions as prepared above. The effect has been determined after 24 hours by counting the dead pests either on the surface of the soil or still remaining on the plants.

The following results have been obtained:

| Compound | Aqueous concentration (in percent active ingredient/water) | Killing rate in percent |
|---|---|---|
| III | 0.001 | 100 |

(b) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent ingredient/water) | Killing rate in percent |
|---|---|---|
| III | 0.01 | 100 |
| IV | 0.01 | 100 |

(c) Against caterpillars of the type diamondback moth (*Plutella maculipennis*): White cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (in percent ingredient/water) | Killing rate in percent |
|---|---|---|
| V | 0.1 | 100 |

(d) Against flies: About 50 flies (*Musca domestica*) are placed under covered petri dishes in which drip wet filter papers have been placed which are sprayed with insecticidal solutions of concentrations as shown below. The living status of the flies has been determined after 24 hours. The following results have been obtained:

| Compound | Aqueous concentration (in percent ingredient/water) | Killing rate in percent |
|---|---|---|
| V | 0.01 | 100 |

*Example 1*

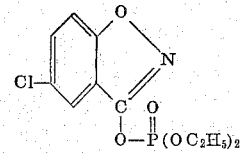

51 g. (0.3 mol) of 3-hydroxy-5-chloro-benzisoxazole (M.P. 215° C.) and 42 g. (0.34 mol) of powdered potassium carbonate are heated in 500 cc. of acetonitrile at 40 to 50° C. for half an hour. During this time the potassium salt of the 3-hydroxy-5-chloro-benzisoxazole, slightly soluble in acetonitrile, forms. Subsequently at 40° C. 54 g. (0.315 mol) of O,O-diethylphosphoric acid chloride are added dropwise to the mixture. Without significant evolution of heat the initially just stirrable suspension of the potassium salt becomes thinly fluid. In the course of half an hour the temperature of the mixture rises to 48° C. Stirring of the latter is continued for two hours at 40 to 50° C. After cooling of the reaction mixture the precipitated salts are filtered off with suction and the solvent is distilled off in vacuum. The residue is taken up in benzene, the benzene solution washed with water and for removal of 3-hydroxy-5-chlorobenzisoxazole which had not entered into reaction, washed with a little 2 N sodium hydroxide. Finally it is washed with a saturated sodium chloride solution until it reacts neutrally. After drying the organic layer over sodium sulphate the solvent is distilled off. 75.5 g. (82.3% of the theoretical yield) remain as a clear pale yellow oil.

*Analysis.*—Calculated for a molecular weight of 305.7: N, 4.58%; Cl, 11.60%; P, 10.24%. Found: N, 4.51%; Cl, 11.48%; P, 10.07%.

Flies and aphids are completely destroyed by 0.01% solutions of the ester.

The mean toxicity of the compound on rats per os amounts to about 7.5 mg. per kg. of animal.

In the same way there may be obtained the following compounds:

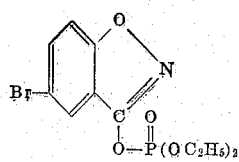

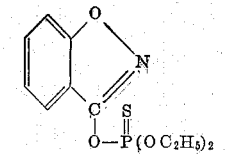

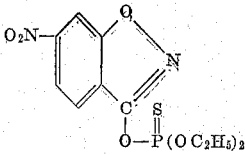

Example 2

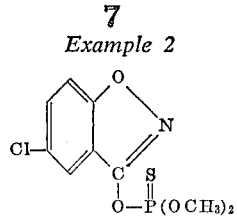

51 g. (0.3 mol) of 3-hydroxy-5-chloro-benzisoxazole (M.P. 215° C.) and 42 g. (0.34 mol) of powdered potassium carbonate are heated in 600 cc. of acetonitrile at 40 to 50° C. for half an hour. To the just still stirrable suspension of the potassium salt of the 3-hydroxy-5-chloro-benzisoxazole, 48.5 g. (0.3 mol) of O,O-dimethyl-thionophosphoric acid chloride are added dropwise without cooling. An exothermic reaction is not to be observed. To complete the reaction the mixture is stirred for 2 hours at 60 to 70° C. After cooling the mixture is poured into water and the precipitated oil is taken up in benzene. The benzene solution is first washed with water, then with a little 2 N sodium hydroxide solution and then again with water until its reaction is neutral. After drying the organic phase over sodium sulphate and distilling off the solvent 74 g. (84.1% of the theoretical yield) of the above compound remain as a yellow-orange coloured oil.

*Analysis:*—Calculated for a molecular weight of 293.7: N, 4.77%; S, 10.92%; Cl, 12.07%. Found: N, 4.54%; S, 10.82%; Cl, 11.89%.

The mean toxicity ($DL_{50}$) on rats per os was found at 1000 mg. per kg. of animal.

Flies and aphids are killed to 100% by 0.001% solutions of the ester.

In the same manner there may be produced the following compounds:

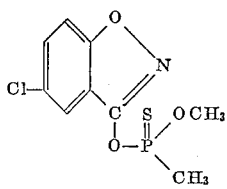  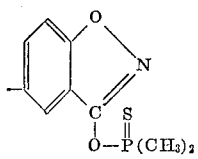

Example 3

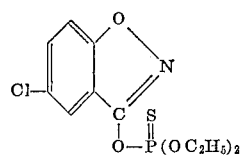

51 g. (0.3 mol) of 3-hydroxy-5-chloro-benzisoxazole (M.P. 215° C.) and 42 g. (0.34 mol) of powdered potassium carbonate are heated in 500 cc. of acetonitrile at 40 to 50° C. for half an hour. Subsequently at 35 to 40° C. 57 g. (0.3 mol) of O,O-diethyl-thionophosphoric acid chloride are added dropwise to the mixture and the latter is heated to complete the reaction for a further 3 hours at 60 to 70° C. After cooling, the mixture is poured into watter, the precipitated oil is taken up in benzene, the benzene solution washed with water and a little 2 N sodium hydroxide solution and finally again with water. After drying the organic layer over sodium sulphate and distilling off the solvent 86 g. of the above mentioned compound are obtained as a greenish yellow oil. The yield amounts to 89.1% of the theoretical.

*Analysis:*—Calculated for a molecular weight of 321.7: N, 4.36%; S, 9.97%; Cl, 11.02%. Found: N, 4.26%; S, 10.17%; Cl, 10.93%.

The mean toxicity of the compound on rats per os amounts to 50 to 100 mg. per kg. of animal.

Aphids are destroyed to 100% with 0.0001% solutions, spider mites are killed to 50% with 0.0001% solutions and caterpillars to 100% by 0.001% solutions of the ester. Blowfly larvae are destroyed to 100% with 3 p.p.m. of the compound.

In the same manner there may be produced the following compounds:

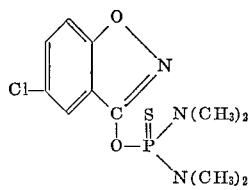  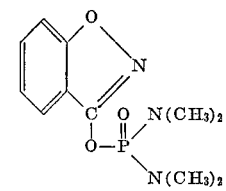

Example 4

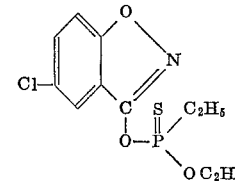

51 g. (0.3 mol) of 3-hydroxy-5-chloro-benzisoxazole (M.P. 215° C.) and 42 g. (0.34 mol) of powdered potassium carbonate are heated in 600 cc. of acetonitrile at 40 to 50° C. for half an hour. To this suspension of the potassium salt of 3-hydroxy-5-chloro-benzisoxazole, 52 g. (0.3 mol) of ethyl-thionophosphonic acid-O-ethyl ester chloride are added dropwise. Subsequently the mixture is heated for a further 3 hours at 60 to 70° C., then allowed to cool and poured into water. The precipitated oil is taken up in benzene and the benzbene solution then worked up as repeatedly described in the preceding examples. 70 g. (76.4% of the theoretical yield) of the above ester are obtained in the form of an orange coloured oil.

*Analysis.*—Calculated for a molecular weight of 305.7: N, 4.58%; Cl, 11.63%; S, 10.48%. Found: N, 4.52%; Cl, 11.57%; S, 10.44%.

Flies and caterpillars are completely destroyed by 0.001% solutions of the ester.

By the same method there may be obtained the following compounds:

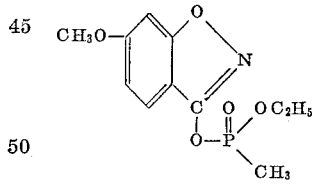  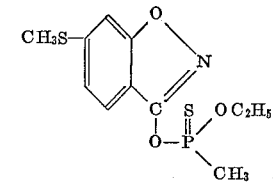

Example 5

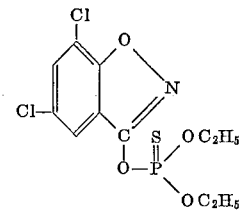

61 g. (0.3 mol) of 3-hydroxy-5-chloro-benzisoxazole (M.P. 227° C.) are suspended in 200 cc. of pyridine. After 15 minutes' stirring of the mixture a solution results. 62 g. (0.3 mol) of O,O-diethylthionophosphoric acid chloride are added dropwise to the mixture at 25° C. whereby the temperature of the mixture gradually rises to 33 to 35° C. and the pyridinium hydrochloride precipitates. Stirring is continued for an hour during cooling and the mixture is then poured into 208 cc. of concentrated hydrochloric acid mixed with ice. The initially precipitated oil rapidly solidifies. The crystals are filtered off with suction and dried on a clay dish. After recrystalisation from petroleum ether colourless leaflets are obtained of M.P. 37 to 38° C. The yield amounts to 73.5 g. (68.7% of the theoretical).

*Analysis.*—Calculated for a molecular weight of 356.2: N, 3.93%; Cl, 19.91%; S, 9.00%. Found: N, 3.94%; Cl, 19.61%; S, 9.29%.

The mean toxicity of the compound on rats per os amounts to about 100 mg. per kg. of animal.

Caterpillars are completely destroyed by 0.1% solutions of the ester.

In the same manner there may be produced the following compounds:

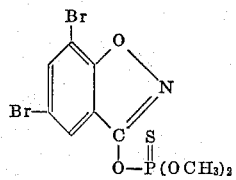 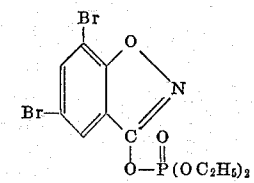

*Example 6*

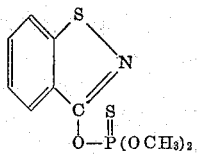

50 g. (0.3 mole) of 3-hydroxy-1,2-benzisothiazole (M.P. 156 to 157° C.) are dissolved in 100 cc. of dimethylformamide. After 51 g. (0.36 mole) of finely powdered potassium carbonate have been added, the mixture is stirred for 10 minutes, and it is then treated dropwise at 20 to 30° C., whilst cooling externally, with 51 g. (0.3 mole) of O,O-dimethyl-thionophosphoric acid chloride.

The reaction mixture is subsequently stirred overnight at room temperature and then poured into water, the separated oil is taken up in benzene, the benzene solution washed once with 2 N sodium hydroxide solution and thereafter with water until its reaction is neutral. When the organic phase has been dried over sodium sulphate and the solvent distilled off, 48 g. (58.6% of the theoretical yield) of O,O-dimethyl-thionophosphoric acid-O-(1,2-benzisothiazolyl-3) ester are obtained in the form of a reddish-yellow oil.

*Analysis.*—Calculated for a molecular weight of 274.3: N, 5.11%; S, 23.38%; P, 11.29%. Found: N, 5.08%; S, 23.29%; P, 11.14%.

Aphids and spider mites are completely destroyed by 0.001% solutions of the ester.

*Example 7*

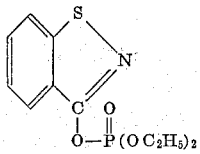

50 g. (0.3 mole) of 3-hydroxy-1,2-benzisothiazole are dissolved in 200 cc. of dimethyl formamide, this solution is stirred for 10 minutes after the addition of 51 g. (0.3 mole) of potassium carbonate, and 54 g. (0.315 mole) of O,O-diethylphosphoric acid chloride are then added dropwise to the reaction mixture at 30 to 40° C., with external cooling. The latter is thereafter stirred overnight at room temperature to complete the reaction and subsequently treated with water, and the separated oil is taken up in benzene. The benzene solution is washed with 2 N sodium hydroxide solution and thereafter with water until its reaction is neutral. After the organic layer has been dried over sodium sulphate, the solvent is distilled off and the residue fractionated under a strongly reduced pressure. 61 g. (71% of the theoretical yield) of O,O-diethyl-phosphoric acid-O-(1,2-benzisothiazolyl-3) ester are obtained in the form of a light yellow oil boiling at 120 to 121° C./0.001 mm. Hg.

*Analysis.*—Calculated for a molecular weight of 287.3: N, 4.88%; P, 10.78%. Found: N, 4.77%; P, 10.88%.

Aphids and spider mites are killed to 100% by 0.01% solutions of the ester. Moreover it shows an ovicidal action against the eggs of spider mites.

By the same methods there may be produced the following compounds:

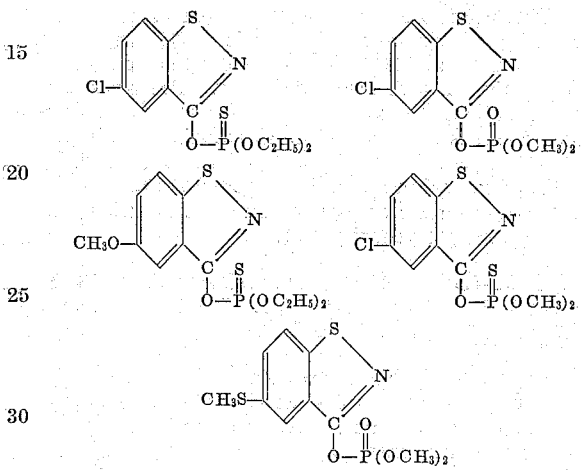

*Example 8*

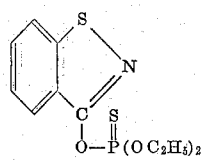

A solution of 50 g. (0.3 mole) of 3-hydroxy-1,2-benzisothiazole in 200 cc. of dimethylformamide is stirred for 10 minutes after the addition of 51 g. (0.36 mole) of potassium carbonate, and then treated dropwise at 40° C. with 60 g. (0.315 mole) of O,O-diethyl-thionophosphoric acid chloride. The ensuing reaction is so weakly exothermal that only a temporary external cooling of the mixture becomes necessary. The reaction mixture is subsequently stirred overnight at room temperature and it is then poured into much water. The separated oil is taken up in benzene, and the benzene solution washed with 2 N sodium hydroxide solution and thereafter with water until its reaction is neutral. When the organic phase has been dried over sodium sulphate, the solvent is distilled off and the residue is fractionated in a high vacuum. The remaining O,O-diethylthionophosphoric acid-O-(1,2-benzisothiazolyl-3) ester distills at 110° C. under a pressure of 0.01 mm. Hg in the form of a light yellow oil. The yield amounts to 71 g. (78.2% of the theoretical).

*Analysis.*—Calculated for a molecular weight of 303.3: N, 4.62%; S, 21.14%; P, 10.21%. Found: N, 4.60%; S, 21.16%; P, 10.25%.

Aphids are completely destroyed by 01% solutions of the ester.

In the same manner there may be produced the following compounds:

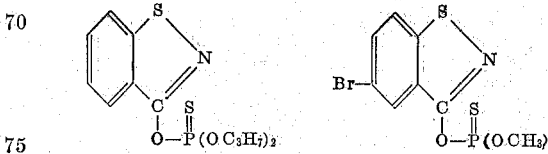

Example 9

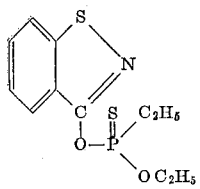

50 g. (0.3 mole) of 3-hydroxy-1,2-benziosothiazole are dissolved in 100 cc. of dimethylformamide, this solution is treated with 51 g. (0.36 mole) of potassium carbonate, it is thereafter stirred for another 10 minutes, and 55 g. (0.3 mole) of ethyl-thionophosphonic acid-O-ethyl ester chloride are then added dropwise to the reaction mixture at 30 to 40° C., with external cooling. The mixture is stirred overnight at room temperature to complete the reaction, and it is then worked up as described in the preceding examples. 67 g. (78% of the theoretical yield) of ethyl - thionophosphonic acid-O-ethyl-O-(1,2-benzisothiazolyl-3) ester are obtained in the form of an oil with an orange to light yellow colour.

*Analysis.*—Calculated for a molecular weight of 287.3: N, 4.88%; S, 22.33%; P, 10.78%. Found: N, 4.78%; S, 22.56%; P, 10.81%.

Flies and spider mites are completely destroyed by 0.01% solutions of the ester, which possesses moreover an ovicidal activity against the eggs of spider mites. In the same way there may be produced the following compounds:

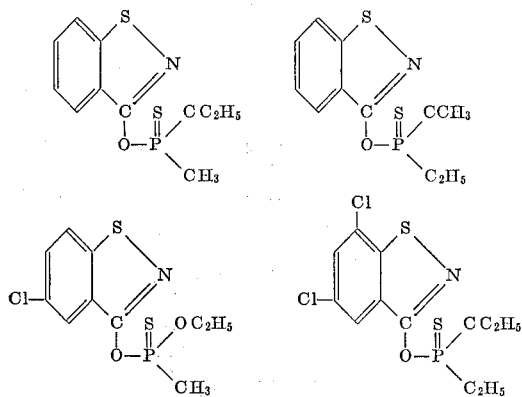

Example 10

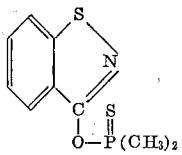

50 g. (0.3 mole) of 3-hydroxy-1,2-benzisothiazole are dissolved in 80 cc. of pyridine. 41 g. (0.3 mole) of di-methylthionophosphinic acid chloride are added dropwise to this solution at 10 to 20° C. The progress of the reaction is strongly exothermal; pyridinium hydrochloride separates after a short time. The mixture is subsequently stirred at room temperature for another hour, and it is then poured into 250 cc. of water, acidified with 75 cc. of diluted (1:1) hydrochloric acid. The dimethyl- thionophosphinic acid-O-(1,2-benzisothiazolyl-3) ester which has separated in the form of crystals is filtered off with suction and washed with water until its reaction is neutral. The compound is obtained in the form of colourless coarse prisms of M.P. 106° C. by recrystallisation from isopropyl alcohol. The yield amounts to 66 g. (90.4% of the theoretical). Aphids are completely destroyed by 0.1% solutions of the ester. By the same methods there may be obtained the following compounds:

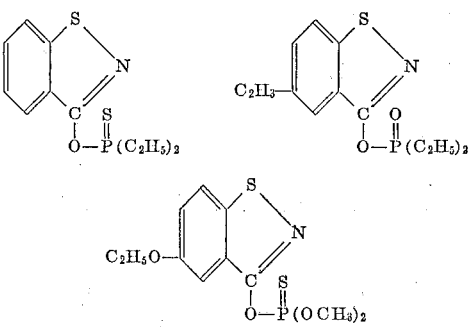

Example 11

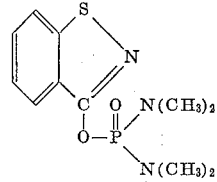

60 g. (0.4 mole) of 3-hydroxy-1,2-benzisothiazole are dissolved in 150 cc. of dimethylformamide, the solution is stirred for 10 minutes after the addition of 61 g. (0.44 mole) of finely powdered potassium carbonate, and 75 g. (0.44 mole) of bis-(N,N-dimethylamido)-phosphoric acid chloride are then added dropwise to the reaction mixture at 30 to 40° C. The mixture is subsequently heated to 50 to 55° C. for 2 hours. When it has cooled down, the separated salts are filtered off with suction and the solvent is evaporated in a high vacuum. The remaining residue is taken up in benzene, the benzene solution is washed with water and with 2 N sodium hydroxide solution and thereafter again with water until its reaction is neutral, the organic phase is dried over sodium sulphate, and the solvent is finally distilled off. After prolonged standing, the residue solidifies in the form of a pale yellow crystal mass of M.P. 66 to 67° C. The yield amounts to 70 g. (61.5% of the theoretical).

Caterpillars are completely destroyed by 0.1% solutions of the ester. In the same way there may be produced the following compounds:

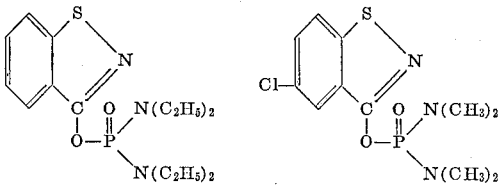

I claim:
1. A compound of the formula

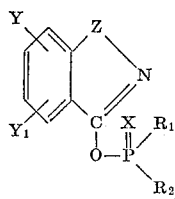

in which $R_1$ and $R_2$ stand independently for a member selected from the group consisting of lower alkyl having up to 4 carbon atoms, lower alkoxy having up to 4 carbon atoms, lower alkylamino having up to 4 carbon atoms and lower dialkyl amino having up to 4 carbon atoms, in which X and Z stand independently for a chalkogen of an atomic weight less than 40 and Y and $Y_1$ stand independently for a member selected from the group consisting of hydrogen, chlorine, bromine, iodine, lower alkyl having up to 4 carbon atoms, lower alkoxy having up to 4 carbon atoms and lower alkyl mercapto having up to 4 carbon atoms.

2. The compound of the formula

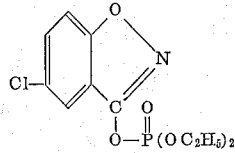

3. The compound of the formula

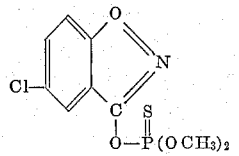

4. The compound of the formula

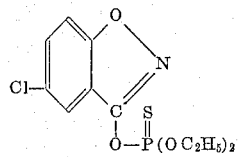

5. The compound of the formula

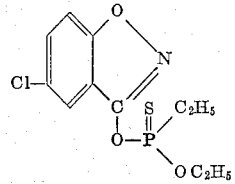

6. The compound of the formula

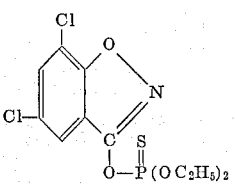

7. A compound of the formula

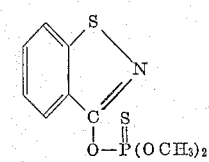

8. A compound of the formula

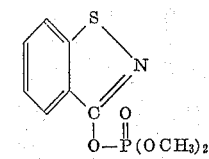

9. A compound of the formula

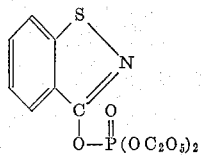

10. A compound of the formula

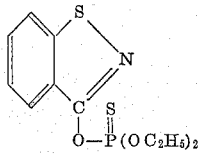

11. A compound of the formula

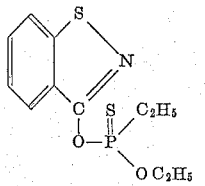

12. A compound of the formula

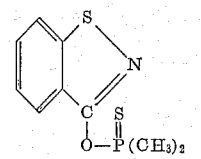

13. A compound of the formula

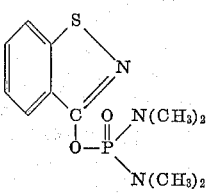

14. A compound according to claim 1 wherein Y is hydrogen, $Y_1$ is chlorine and $R_1$ and $R_2$ are lower alkoxy.

15. A compound according to claim 1 wherein Y is hydrogen, $Y_1$ is chlorine, $R_1$ is lower alkyl and $R_2$ is lower alkoxy.

16. A compound according to claim 1 wherein Y and $Y_1$ are chlorine and $R_1$ and $R_2$ are lower alkoxy.

17. A compound according to claim 1 wherein Y and $Y_1$ are hydrogen and $R_1$ and $R_2$ are lower alkoxy.

18. A compound according to claim 1 wherein Y and $Y_1$ are hydrogen, $R_1$ is lower alkyl and $R_2$ is lower alkoxy.

19. A compound according to claim 1 wherein Y and $Y_1$ are hydrogen and $R_1$ and $R_2$ are lower alkyl.

20. A compound according to claim 1 wherein Y and $Y_1$ are hydrogen and $R_1$ and $R_2$ are lower dialkyl amino.

No references cited.

NICHOLAS S. RIZZO, *Primary Examiner.*